(12) United States Patent
Ebstyne et al.

(10) Patent No.: US 10,740,949 B2
(45) Date of Patent: Aug. 11, 2020

(54) MULTI-SPECTRAL RENDERING FOR SYNTHETICS

(71) Applicant: Microsoft Technology Licensing, LLC, Redmond, WA (US)

(72) Inventors: Michael J. Ebstyne, Seattle, WA (US); Jonathan C. Hanzelka, Kenmore, WA (US); Emanuel Shalev, Sammamish, WA (US); Trebor L. Connell, Seattle, WA (US); Pedro U. Escos, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/134,958

(22) Filed: Sep. 18, 2018

(65) Prior Publication Data

US 2020/0090398 A1   Mar. 19, 2020

(51) Int. Cl.
*G06T 15/00* (2011.01)
*G06T 15/02* (2011.01)
*G06T 15/50* (2011.01)

(52) U.S. Cl.
CPC ............ *G06T 15/005* (2013.01); *G06T 15/02* (2013.01); *G06T 15/50* (2013.01)

(58) Field of Classification Search
CPC ........ G06T 15/005; G06T 15/02; G06T 15/50
See application file for complete search history.

(56) References Cited

U.S. PATENT DOCUMENTS

| 5,710,876 A | 1/1998 | Peercy et al. | |
|---|---|---|---|
| 2009/0210447 A1* | 8/2009 | Moshe | G06K 9/2018 |
| 2014/0063009 A1* | 3/2014 | Buehler | G06T 19/20 |
| | | | 345/420 |
| 2014/0193061 A1* | 7/2014 | Miller | G06T 7/0012 |
| | | | 382/133 |

FOREIGN PATENT DOCUMENTS

EP   2779623 A1   9/2014

OTHER PUBLICATIONS

Darling, et al., "Real-Time Multispectral Rendering with Complex Illumination", In Proceedings of the 19th Color and Imaging Conference Final Program and Proceedings, Nov. 7, 2011, pp. 345-351.

(Continued)

*Primary Examiner* — Samantha (Yuehan) Wang

(57) ABSTRACT

Systems and methods are disclosed for leveraging rendering engines to perform multi-spectral rendering by reusing the color channels for additional spectral bands. A digital asset represented by a three dimensional (3D) mesh and a material reference pointer may be rendered using a first material spectral band data set and additionally rendered using a second material spectral band data set, and the results combined to create a multi-spectral rendering. The multi-spectral rendering may then be used as part of a synthetics service or operation. By abstracting the material properties, a material translator is able to return a banded material data set from among a plurality of spectral band sets, and asset material information may advantageously be managed apart from managing each asset individually.

20 Claims, 10 Drawing Sheets

(56) References Cited

OTHER PUBLICATIONS

Peercy, et al., "Linear Color Representations for Efficient Image Synthesis", In Journal of Color Research and Application vol. 21, Issue 2, Apr. 1, 1996, pp. 129-137.

"International Search Report and Written Opinion Issued in PCT Application No. PCT/US2019/038864", dated Oct. 7, 2019, 12 Pages.

* cited by examiner

MULTI-SPECTRAL RENDERING FOR SYNTHETICS

BACKGROUND

Synthetics operations and services may have a use case for multi-spectral rendering of assets, across the electromagnetic (EM) spectrum. For example, a synthetics service may be tasked with rendering an asset beyond merely visible red, green, and blue (RGB) color components, but also in infrared (IR) bands, ultraviolet (UV) bands, and alternative visible light colors. Physically based rendering (PBR) refers to the concept of using realistic shading or lighting models along with measured surface values to accurately represent real-world materials, based on the physical properties of objects, such as various spectral reflectivity values.

High quality rendering engines exist, but are unfortunately constrained to three colors, for example RGB. Creating a new rendering engine capable of rendering additional color and EM spectral bands (e.g., IR and UV) may be a resource-intensive endeavor. Additionally, some artists producing three dimensional (3D) assets may create the assets as a combination of a 3D mesh and an image, used for texel mapping, rather than specifying the material and the material's spectral properties (outside the visible region of the light spectrum). This may hamper the ability to create a multi-spectral rendering of the asset outside the RGB color space.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to multi-spectral rendering by: receiving a selection of at least one asset for a simulation; receiving a spectrum selection for the simulation; receiving a mesh and a material pointer for the at least one asset; identifying a first spectral band selection within the spectrum selection for the simulation; based at least on the material pointer and the first spectral band selection, receiving a first banded material data set from among a plurality of spectral band sets, wherein the plurality of spectral band sets comprises the first banded material data set and a second banded material data set; and rendering the at least one asset according to the mesh and first banded material data set.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
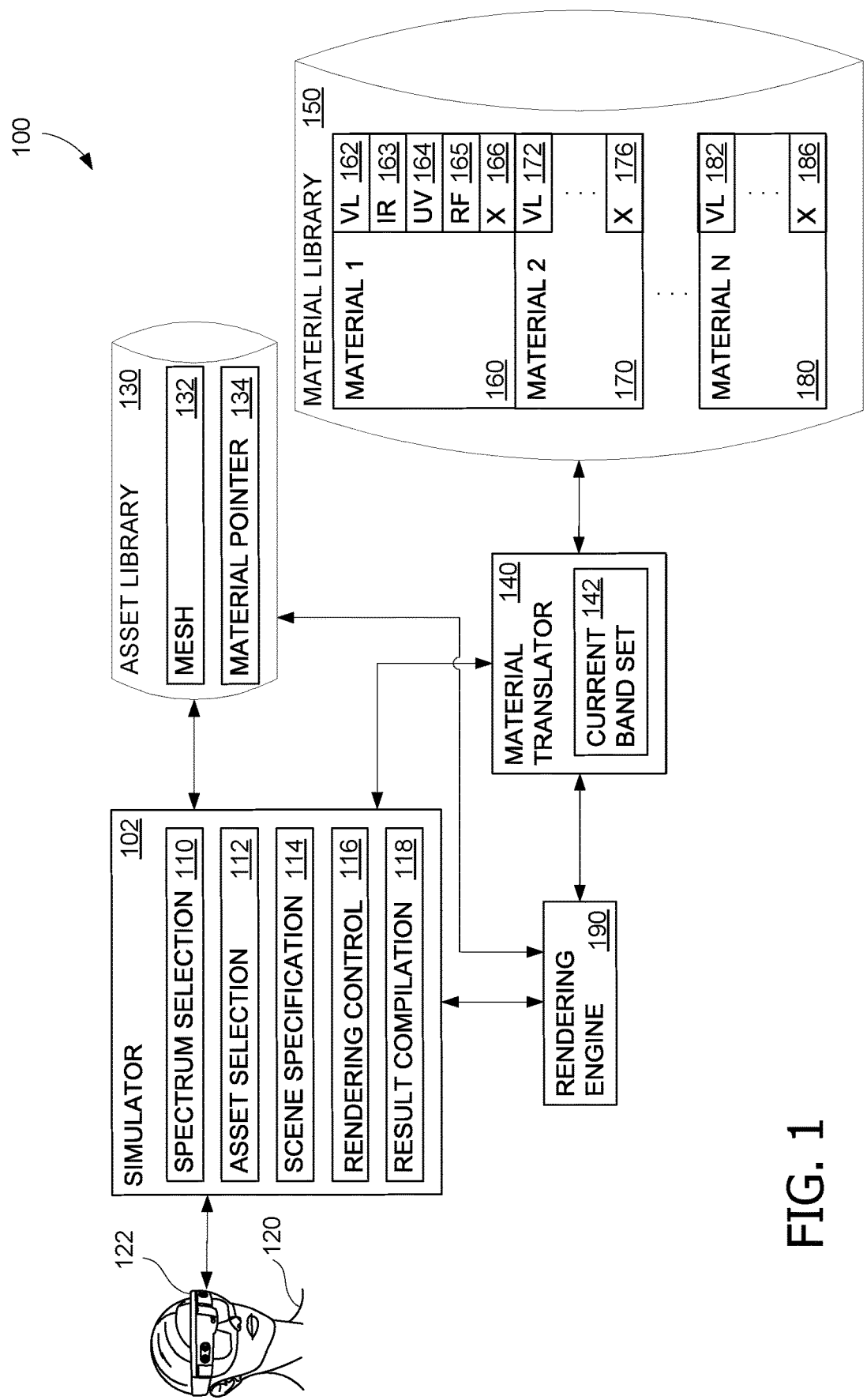
FIG. 1 illustrates an exemplary multi-spectral rendering arrangement.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Synthetics operations and services (for example, synthetics services 1212 of FIG. 12) may have a use case for multi-spectral rendering of assets, across the electromagnetic (EM) spectrum. For example, a synthetics service may be tasked with rendering an asset beyond merely visible red, green, and blue (RGB) color components, but also in infrared (IR) bands, ultraviolet (UV) bands, and alternative visible light colors. Physically based rendering (PBR) refers to the concept of using realistic shading or lighting models along with measured surface values to accurately represent real-world materials, based on the physical properties of objects, such as various spectral reflectivity values.

High quality rendering engines do exist, but are unfortunately constrained to three colors, for example RGB. Creating a new rendering engine capable of rendering additional color and EM spectral bands (e.g., IR and UV) may be a resource-intensive endeavor, and prohibitively expensive in many scenarios. Additionally, some artists producing three dimensional (3D) assets may create the assets as a combination of a 3D mesh and an image, used for texel mapping, rather than specifying the material and the material's spectral properties. Since a material's spectral properties are not specified with a texel map, including spectral regions beyond the visible light band, this may hamper the ability to create a multi-spectral rendering of the asset outside the visible region of the light spectrum.

Therefore, systems and methods are disclosed for leveraging rendering engines to perform multi-spectral rendering by reusing the color channels for additional spectral bands. A digital asset represented by a 3D mesh and a material reference pointer may be rendered using a first material spectral band data set and additionally rendered using a second material spectral band data set, and the results combined to create a multi-spectral rendering. The multi-spectral rendering may then be used as part of a synthetics service or operation. By abstracting the material properties, a material translator is able to return a banded material data set from among a plurality of spectral band sets, and asset material information may advantageously be managed apart from managing each asset individually.

The disclosed solution may leverage legacy rendering technology to produce datasets for modeling sensors that capture signal from different bands of the EM. Each mesh in a 3D object (asset) can have one or more materials assigned to it, and the proper reflectance for each spectral band is achieved assigning values that are spectrum specific to the properties of a traditional PBR material definition. Materials associated with each asset may be categorized by type, such has "wood" or "metal" and have variations, such as "Visible" or "Infrared." This reflectance information is stored in a material library that may be accessed in order to change the appearance of an asset procedurally, by choosing which material type to use, and which band of the spectrum is targeted. A unique ID associated with a specific material variation is intercepted by a material translator that pulls the proper values from the material library for rendering.

By abstracting the material properties, a material translator is able to return a banded material data set from among a plurality of spectral band sets, and asset material information may advantageously be managed apart from managing each asset individually.

Figure 10:
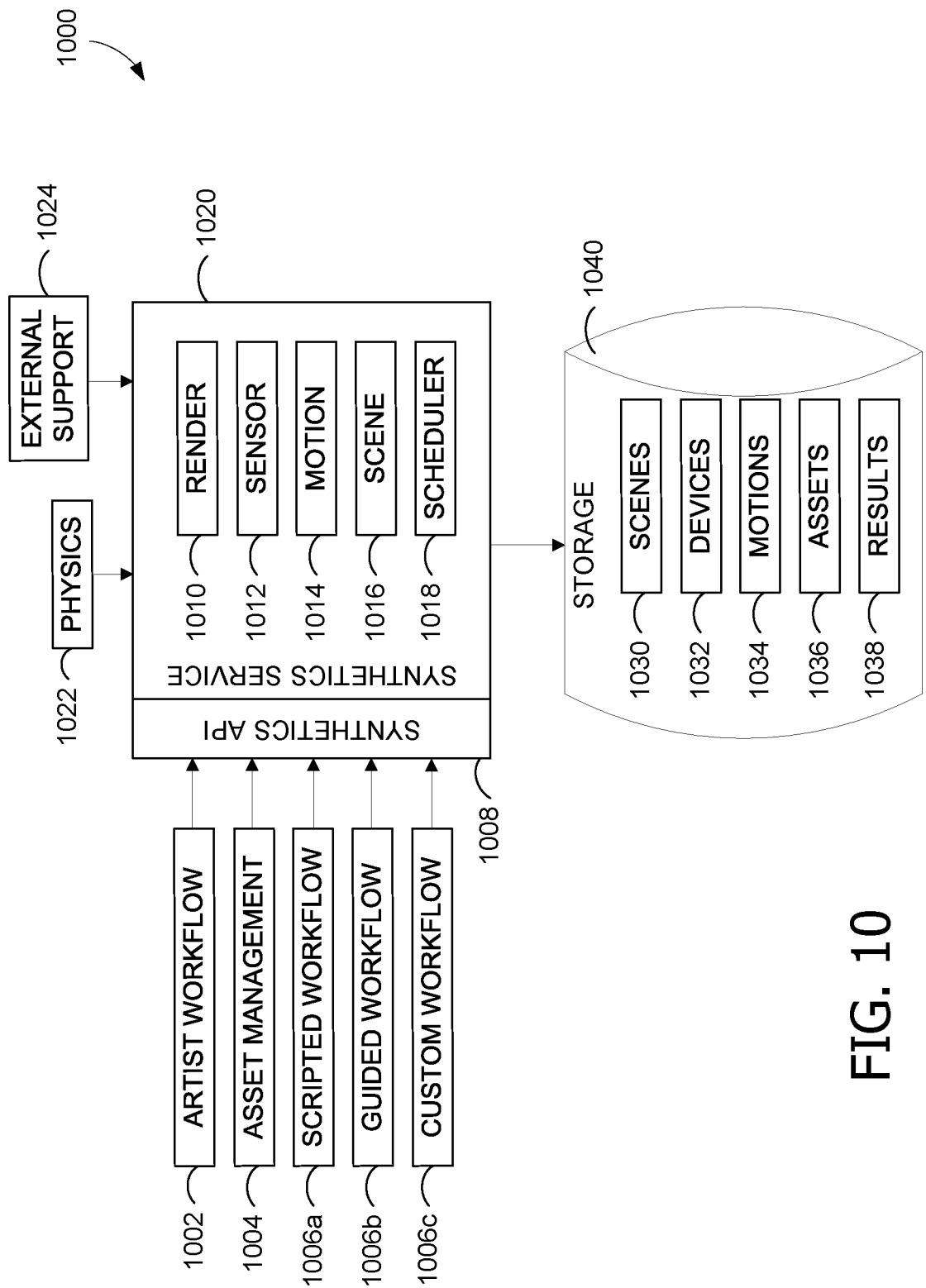
FIG. 10 is a block diagram of an architecture for creating synthetic imagery, that may be used with some of the various examples disclosed herein.

FIG. 1 illustrates an exemplary multi-spectral rendering arrangement 100, which may be a portion of a larger an architecture 1000 for creating synthetic imagery (see FIG. 10). Arrangement 100 includes a simulator component 102, an asset library 130, a material library 150, a material translator component 140, and a rendering engine 190. In some examples, rendering engine 190 may be a legacy rendering engine that can operate on only 3 color bands, nominally RGB. Simulator component 102 is illustrated as holding multiple data and operational modules, including a spectrum selection 110, an asset selection 112, a scene specification 114, a rendering control 116, and a result compilation 118.

Simulator component 102 is operative to receive a spectrum selection from a user 120 and allocate the spectrum selection among the plurality of spectral band sets (see, for example, plurality of spectral band sets 504 in FIG. 5), if the spectrum selection comprises more than merely RGB. Asset selection 112 selects an asset from asset library 130, including a mesh 132 from a set of meshes and a material pointer 134 associated with mesh 132, from a set of material pointers. An asset is a combination of mesh 132 and material pointer 134 (see FIG. 2). It should be understood that asset library 130 may contain a mesh 132 a material pointer 134 for each of multiple assets, perhaps numbering in the thousands or more. By abstracting the material properties with a pointer, asset material information may be advantageously managed apart from managing each asset individually.

Simulator component 102 is additionally operative to control rendering engine 190 with rendering control 116 to render an asset according to a selected mesh and a banded material data set (which is placed in the RGB color channel of rendering engine 190). That is, simulator component 102 is operative to control rendering engine 190 to render an asset according to the mesh and a first banded material data set, and is further operative to control rendering engine 190 to additionally render the asset according to the mesh and a second banded material data set. In such an example operation, rendering engine 190 renders the asset twice, using different banded material data sets, each iteration operating as if the banded material data set was RGB color information. Simulator component 102 is further operative to combine, using result compilation 118, a result of rendering the at least one asset according to the mesh and the first banded material data set with a result of rendering the at least one asset according to the mesh and the second banded material data set into a combined spectrum result. Additional results may also be combined, using result compilation 118. Simulator component 102 may then control a display, such as head mounted display (HMD) 122 to display the results of the simulation to user 120. It should be understood, however, that additional types of displays may also be used.

For example, a certain simulation scenario may involve the use of 12 different specified spectral bands: RGB (three bands), plus three bands in each of IR, UV, and radio frequency (RF) spectral regions. However, rendering engine 190 can handle only three bands at a time, treating these three bands as RGB. However, it is only pixel reflectivity information that can be used to represent any other set of three spectral bands. So, spectrum selection 110 allocates the 12 different bands of the spectrum selection among a plurality of spectral band sets, dividing 12 by three to generate a set of four different rendering events. Rendering control 116 controls rendering engine 190 to perform each of the four rendering events, with three spectral components in each rendering event, and then result compilation 118 combines the results of the four rendering events to produce a combined spectrum result having results for all 12 different specified spectral bands. User 120 may then view a simulated IR rendering of the asset using HMD 122.

In each rendering event, either simulator component 102 or rendering engine 190 retrieves the assed information (mesh 132 and material pointer 134) from asset library and then attempts retrieve material data from material library 150, using material pointer 134. As part of this retrieval process, material translator component 140 interrogates the requesting component (e.g., simulator component 102 or rendering engine 190) regarding the spectral band of interest. The requesting component then responds by identifying the current band set 142. Material translator component 140 is then able to either return a pointer to the specific banded material data set in material library 150, or fetches the specific banded material data set from material library 150 and returns it. Thus, material translator component 140 is operative to, based at least on the material pointer and a first spectral band selection, indicate a first banded material data set from among a plurality of spectral band sets in material library 150. Each banded material data set has a unique ID in material library 150. By abstracting the material properties, first in asset library 130 using a material pointer 134, and also in material library 150, material translator component 140 is thus able to return a banded material data set from among a plurality of spectral band sets.

Material library 150 includes banded material data comprising, for at least one material, spectral band information for a plurality of spectral band sets. As illustrated, material library 150 holds material 1 information 160, which includes a visible light (VL) banded material data set 162, which comprises a first set of visible light spectral bands. In some examples, the first set of visible light spectral bands comprises red, green, and blue colors of visible light. Material 1 information 160 also includes an IR banded material data set 163 that comprises one or more IR light spectral bands, and a UV banded material data set 164 that comprises one or more UV light spectral bands. As illustrated, material 1 information 160 also includes a RF banded material data set 165 that comprises pixel reflectivity data for one or more RF spectral bands, and a general (X) banded material data set 166. X banded material data set 166 may comprise one or more microwave (MW) spectral bands or a banded material data set comprising a second set of visible light spectral bands different than the first set of visible light spectral bands. For example, the second set of visible light spectral bands may include orange, yellow, and purple. Other combinations of spectral bands may also be used. Material library also includes banded material data sets for additional materials, for example, material 2 information 170 comprising banded material data sets 172 and 176, and material 3 information 180 comprising banded material data sets 182 and 186.

Figure 2:
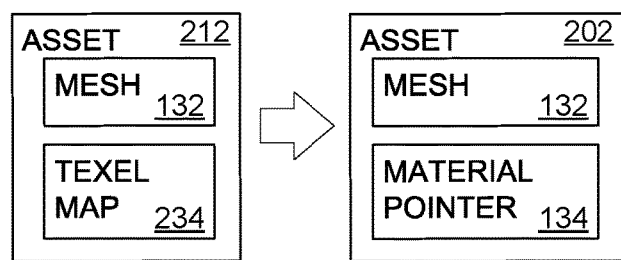
FIG. 2 illustrates further detail for an aspect of the multi-spectral rendering arrangement of FIG. 1.

FIG. 2 illustrates further detail for an aspect of multi-spectral rendering arrangement 100 of FIG. 1. Specifically, FIG. 2 illustrates an aspect of abstracting asset material data. An asset 202 is represented as comprising mesh 132 and material pointer 134, rather than being represented as an asset 212 comprising mesh 132 and a texel map 234. The representation as asset 202, using material pointer 134, permits efficient multi-spectral rendering operations.

Figure 3:
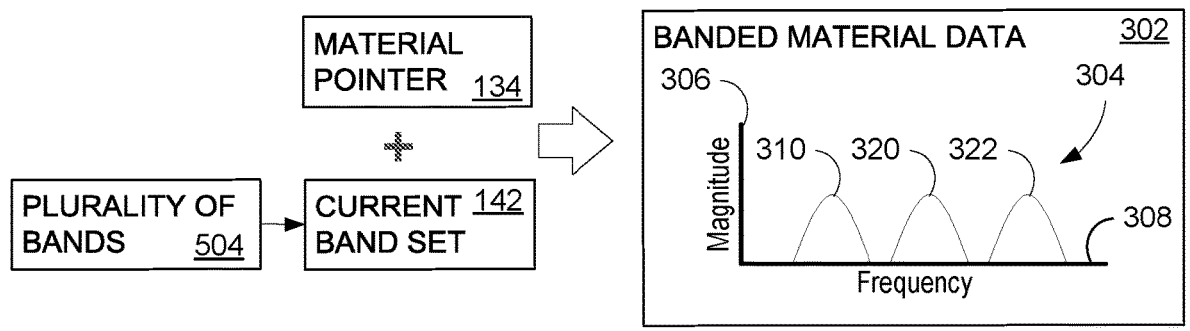
FIG. 3 illustrates further detail for another aspect of the multi-spectral rendering arrangement of FIG. 1.

FIG. 3 illustrates further detail for another aspect of multi-spectral rendering arrangement 100 of FIG. 1. Specifically, FIG. 3 illustrates another aspect abstracting asset material data. Material pointer 134 is used with current band set 142 to specify banded material data 302. Banded material data 302 can be any of VL banded data set 162, IR banded material data set 163, UV banded material data set 164, RF banded material data set 165, and X banded material data set 166, or any other suitable banded material data. Current band set 142 is selected from among a plurality of spectral band sets 504, described further in relation to FIG. 5. Banded material data 302 contains spectral band information 304, which is a measure of reflectivity of the material (in a given pixel) for a specific frequency (or EM wavelength). This information may be stored as numeric values, but is represented as a spectral graph having a magnitude axis 306 and a frequency axis 308. Three spectral response curves 310, 312, and 314 are illustrated, to represent that a particular material may have a unique spectral response. The reflectivity of a material in the visible light portion of the EM spectrum is what provides an object's color. This same concept, however, carries over to other portions of the EM spectrum, permitting the reuse of a legacy renderer's RGB color channel for other, non-visible light reflectivity values, such as IR and UV.

Figure 4:
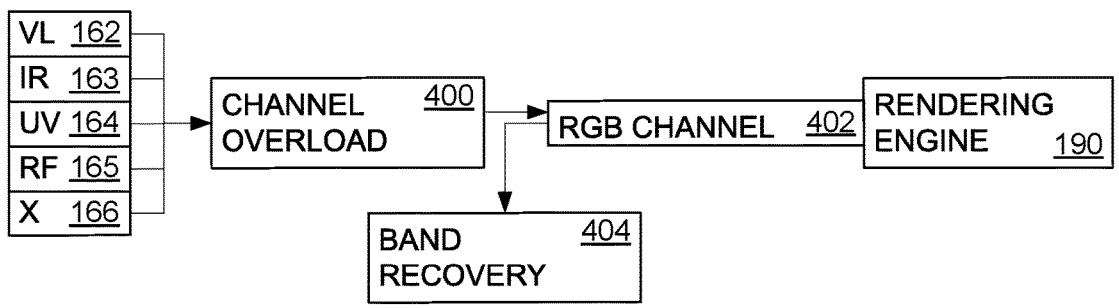
FIG. 4 illustrates further detail for another aspect of the multi-spectral rendering arrangement of FIG. 1.

FIG. 4 illustrates further detail for another aspect of multi-spectral rendering arrangement 100 of FIG. 1. Specifically, FIG. 4 illustrates overloading an RGB channel. Any of VL banded data set 162, IR banded material data set 163, UV banded material data set 164, RF banded material data set 165, and X banded material data set 166 may be represented, by a channel overload operation 400, as RGB data, and fed to rendering engine 190 through its RGB channel 402. RGB channel 402 represents the color data used for rendering in many legacy rendering engines. Upon completion of the rendering, a band recovery operation 404 converts the rendering output result (e.g., RGB image pixels) from RGB channel 402 to the proper spectral band. In an exemplary operation, band recovery operation 404 maps RGB in a rendered image output to the spectrum of the banded material set that was used to overload RGB channel 402. In this manner, channel overload operation 400 reverses the effect that material translator component 140 had by substituting banded material data for RGB data. Band recovery operation 404 includes the operation of result compilation 118 in unwrapping the various spectral components in the final result.

Figure 5:
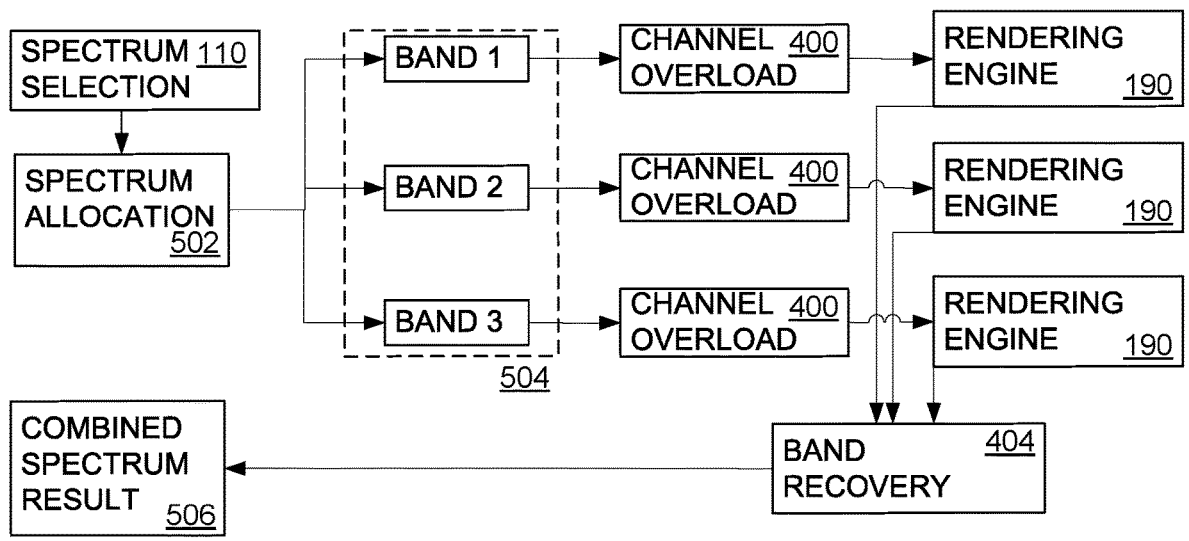
FIG. 5 illustrates further detail for another aspect of the multi-spectral rendering arrangement of FIG. 1.

FIG. 5 illustrates further detail for another aspect of multi-spectral rendering arrangement 100 of FIG. 1. Specifically, FIG. 5 illustrates allocating the spectrum selection among a plurality of spectral band sets and combining the results of rendering an asset according to the mesh and different banded material data sets. Spectrum selection 110, which indicates the spectral components to be used in a simulation, is allocated among a plurality of spectral bands by spectrum allocation operation 502. In an example of nine bands, spectrum allocation operation 502 allocates the nine bands into a plurality of spectral band sets 504. As illustrated, plurality of spectral band sets 504 includes three spectral bands, Band 1, Band 2, and Band 3. For each of Band 1, Band 2, and Band 3, channel overload operation 400 takes the corresponding banded material data (e.g., any of VL banded data set 162, IR banded material data set 163, UV banded material data set 164, RF banded material data set 165, and X banded material data set 166) and feeds it into rendering engine 190. Band recovery operation 404 then converts output RGB colors (from rendering engine 190) to the proper spectral components, and they are combined to create a combined spectrum result 506.

Figure 6:
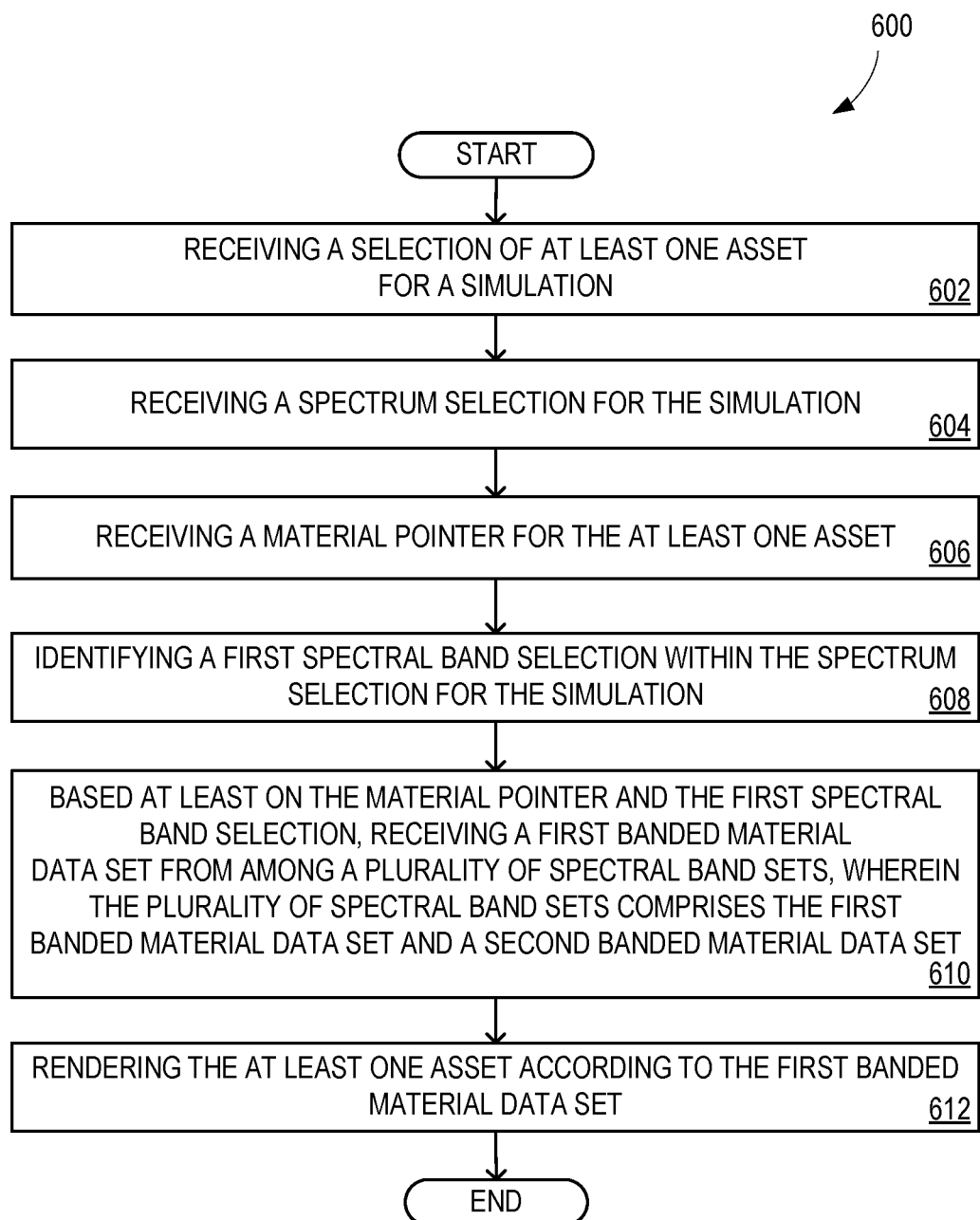
FIG. 6 is a flow chart illustrating exemplary operations involved in multi-spectral rendering that may be used with the arrangement of FIG. 1.

FIG. 6 is a flow chart 600 illustrating exemplary operations involved in multi-spectral rendering that may be used with the arrangement of FIG. 1. The operations illustrated in FIG. 6 may be performed by any suitable processing unit, such as a computing node. Operation 602 includes receiving a selection of at least one asset for a simulation, and operation 604 includes receiving a spectrum selection for the simulation. Operation 606 includes receiving a material pointer for the at least one asset, and operation 608 includes identifying a first spectral band selection within the spectrum selection for the simulation. Operation 610 includes, based at least on the material pointer and the first spectral band selection, receiving a first banded material data set from among a plurality of spectral band sets, wherein the plurality of spectral band sets comprises the first banded material data set and a second banded material data set. Operation 612 includes rendering the at least one asset according to the mesh and the first banded material data set.

Figure 7:
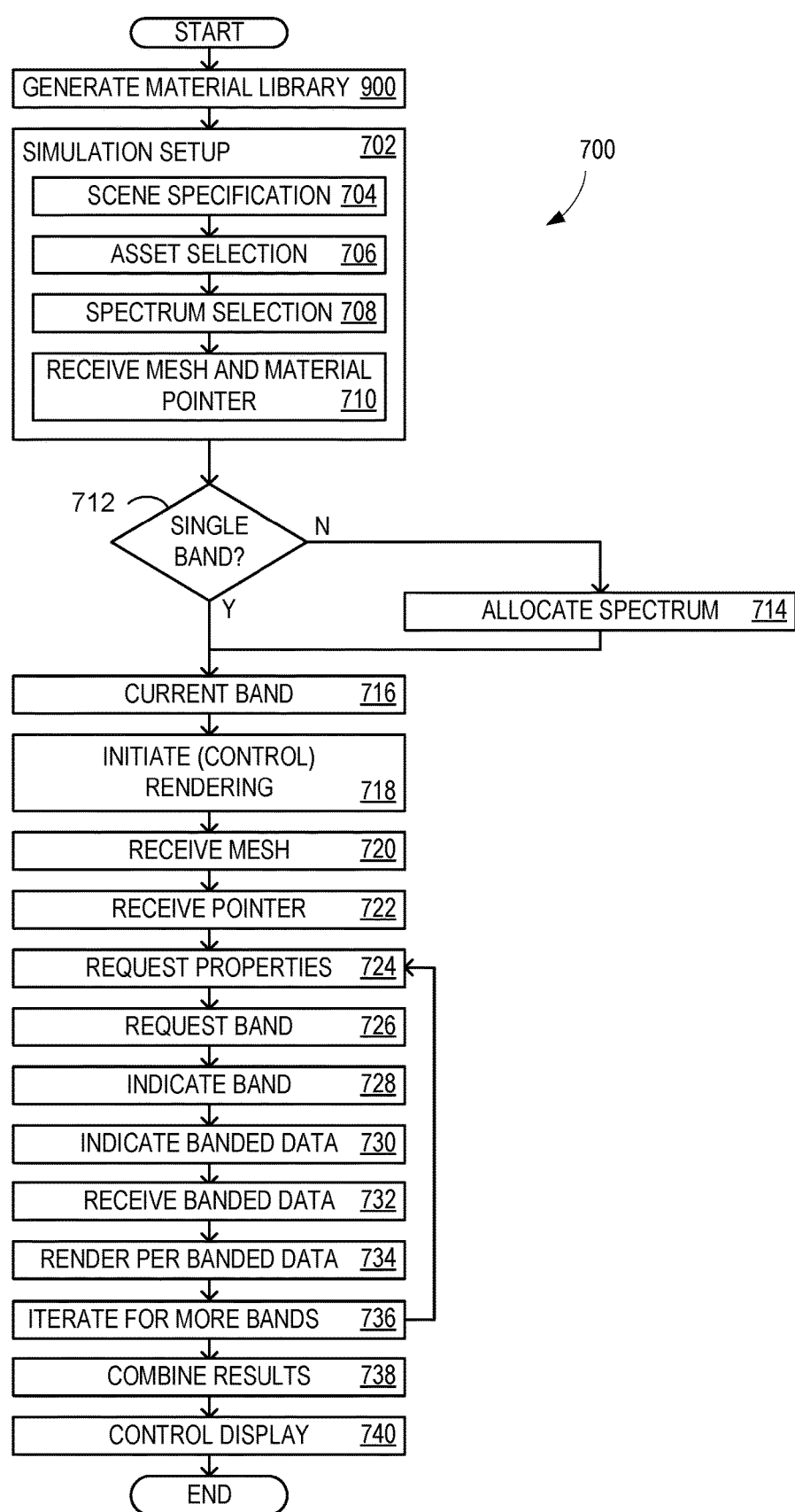
FIG. 7 is another flow chart illustrating exemplary operations involved in multi-spectral rendering that may be used with the arrangement of FIG. 1.

FIG. 7 is a flow chart 700 that also illustrates exemplary operations involved in multi-spectral rendering that may be used with multi-spectral rendering arrangement 100 of FIG. 1. The operations illustrated in FIG. 7 may be performed by any suitable processing unit, such as a computing node. Flow chart 700 begins by optionally performing the operations of flow chart 900, described in FIG. 9, in order to generate an entry into a material library that may be used later, in the operations of flow chart 700. Operation 702 is a simulation setup for a simulator (e.g., simulator component 102 of FIG. 1) that includes further-refined operations 704-710. Operation 704 includes receiving a scene specification, such as a location and camera angle. Operation 706 includes receiving a selection of at least one asset for a simulation, for example an asset in asset library (of FIG. 1). Operation 708 includes a receiving a spectrum selection for the simulation. A user may wish to perform a multi-spectral rendering operation for a synthetics service or simulation. The spectrum selection may include a first set of visible light spectral bands, such as red, green, and blue colors of visible light, and a second set of spectral bands, which may be different colors of visible light, or IR, UV, or another band.

Operation 710 includes receiving a mesh and a material pointer, associated with the mesh, for the at least one asset.

In decision operation 712, the simulator determines whether the spectrum selection corresponds to a single banded material data set in the material library. If not, then operation 714 includes allocating the spectrum selection among a plurality of spectral band sets, the plurality of spectral band sets including a first spectral band set and a second spectral band set corresponding to a banded material data set in the material library. Operation 716 includes identifying a current spectral band selection within the spectrum selection for the simulation. The current spectral band selection may iterate among the first spectral band selection, the second spectral band selection, and as many other spectral band selections as are needed to cover entire specified spectrum for the simulation.

Operation 718 initiates (e.g., controls) a rendering operation, for example by starting rendering engine 190 (of FIG. 1). The rendering engine receives the asset mesh in operation 720 and receives the material pointer for the asset in operation 722. Operation 724 involves the simulator or rendering engine requesting material properties for the at least one asset. A material translator, for example material translator component 140 (of FIG. 1) responds by requesting identification of the current spectral band set, in operation 726. In operation 728, the simulator or rendering engine indicates the current spectral band set, which will be within the spectrum selection for the simulation. In operation 730, based at least on the material pointer and a first spectral band selection, the material translator indicates a first banded material data set of the plurality of spectral band sets. The material translator may return the banded material data set for the current spectral band set or may instead return a pointer to the data within a material library. The banded material data set includes spectral band information (for example, spectral band information 304 of FIG. 3) for the material for the current spectral band, for example, for both a first banded material data set and a second banded material data set.

In operation 732, the simulator or rendering engine then receives the spectral band information for the material for the current spectral band. That is, operation 732 includes, based at least on the material pointer and the current spectral band selection, receiving a current banded material data set from among a plurality of spectral band sets, wherein the plurality of spectral band sets comprises the first banded material data set and the second banded material data set, among possibly others. The first banded material data set may comprise a first set of visible light spectral bands, possibly red, green, and blue colors of visible light. The second banded material data set may comprise a second set of visible light spectral bands different than the first set of visible light spectral bands, for example, orange and purple. Alternatively, the second banded material data set may comprise a set of spectral bands selected from the set consisting of IR, UV, RF, MW, and others.

Operation 734 includes rendering the at least one asset according to the mesh and the current banded material data set. In some examples, this may include overloading the RGB channel of the renderer with the spectral band information of the current banded material data set. In some examples, rendering the at least one asset according to the mesh and the current banded material data set may include using uv mapping to map pixel reflectivity values to the 3D mesh positions. In some examples, rendering the at least one asset according to the mesh and the current banded material data set may include using triplanar projection to map pixel reflectivity values to the 3D mesh positions.

Operation 736 iterates for any additional spectral band sets, if more than one banded material data set is used. Operation 738 combines multiple results, if there is more than one, and includes the operations described for band recovery operation 404 (of FIG. 4). For example, operation 738 may include combining a result of rendering the at least one asset according to the mesh and the first banded material data set with a result of rendering the at least one asset according to the mesh and the second banded material data set into a combined spectrum result. Operation 740 includes controlling a display to render the combined spectrum result, for example HMD 122 (of FIG. 1).

Figure 8:
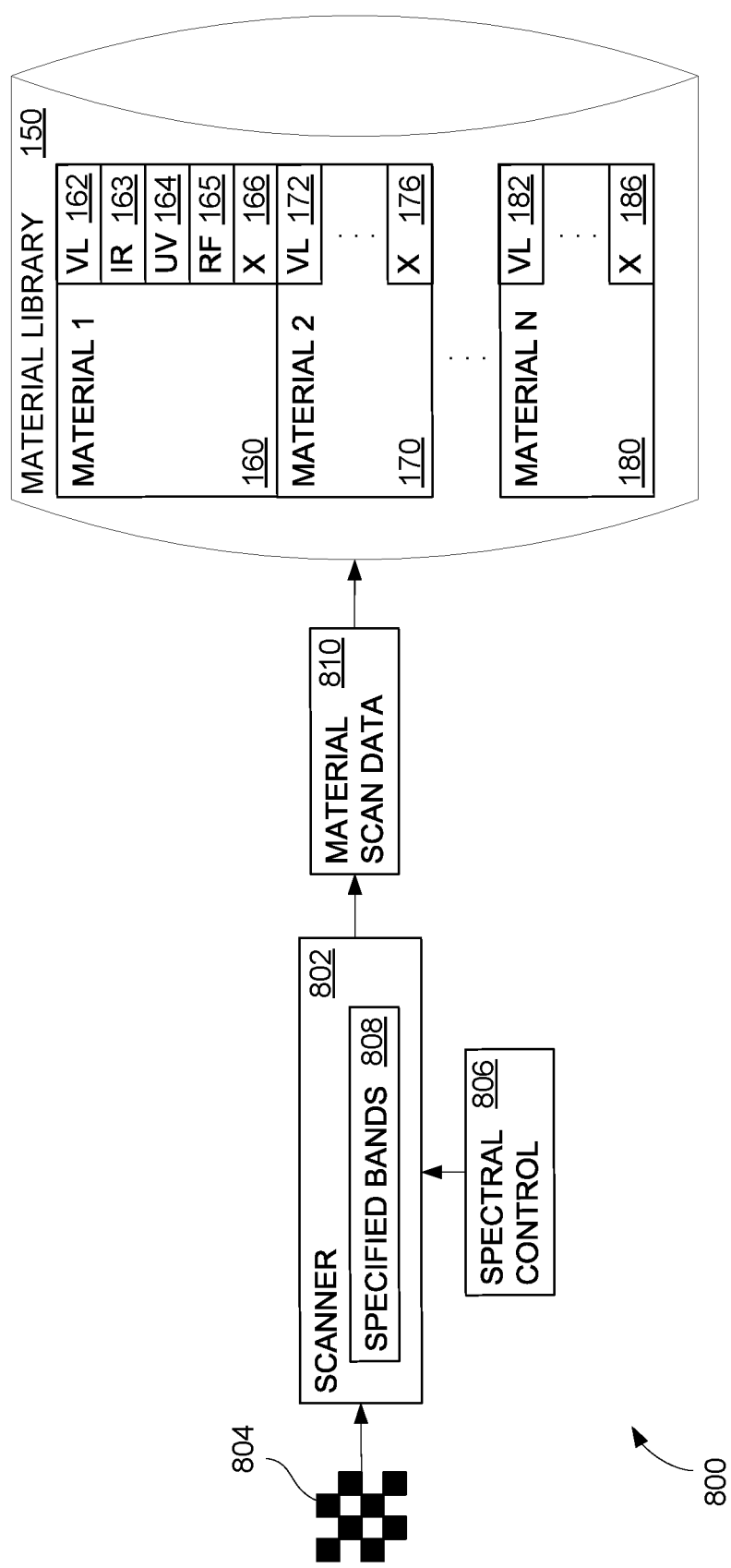
FIG. 8 illustrates a scanner arrangement for generating material library information that may be used in conjunction with the arrangement of FIG. 1.

FIG. 8 illustrates a scanner arrangement 800 for generating material library information that may be used in conjunction with multi-spectral rendering arrangement 100 of FIG. 1. For example, scanner arrangement 800, or a similar arrangement, may provide measurement data for material library 150 (see also FIG. 1). Scanner arrangement 800 includes a scanner 802, which may be used to scan a material sample 804. A spectra control component 806 specifies a set of bands as spectral band set specification 808, for scanning material sample 804. This produces material scan data 810 which is then placed into material library 150. Different scans may have different spectral bands, which may be within the visible light spectrum, or include components, such as IR and UV, that are outside the visible light spectrum. Different materials, for example different types of wood, fabric, and construction materials (e.g., plastic and metal) may be scanned and used to populate material library 150.

Figure 9:
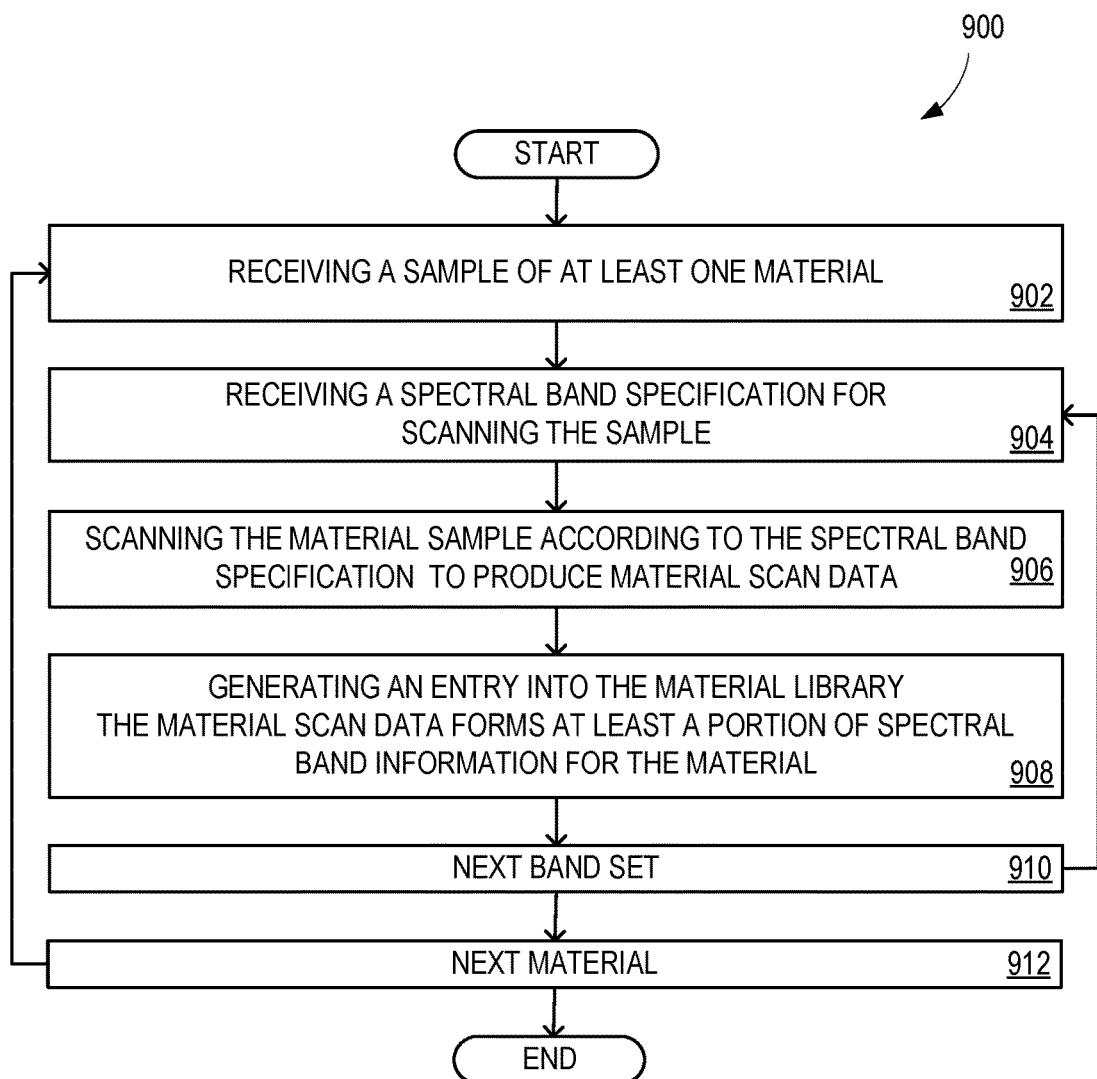
FIG. 9 is a flow chart illustrating exemplary operations involved in generating material library information that may be used with the scanner arrangement of FIG. 8.

FIG. 9 is a flow chart 900 illustrating exemplary operations involved in generating material library information that may be used with the scanner arrangement of FIG. 8. Flow chart 900 of FIG. 9 is described with further reference to FIG. 8. The operations illustrated in FIG. 9 may be performed by any suitable processing unit, such as a computing node. The operations indicated in flow chart 900 may be used to populate, enhance, update, or otherwise improve material library 150 (of FIGS. 1 and 8).

Operation 902 includes receiving a sample 804 of at least one material for spectral property scanning. The material sample 804 is placed into scanner 802, and operation 904 includes receiving, possibly via spectral control component 806, a spectral band set specification 808 for scanning the sample of the at least one material. Operation 906 includes scanning the material sample 804 according to the specified spectral band set 808 to produce material scan data 810. Operation 908 includes generating an entry into material library 150, wherein material scan data 810 forms at least a portion of spectral band information 304 (of FIG. 3) for the at least one material. Operation 910 then iterates for the next spectral band or set of bands, and operation 912 iterates for another material sample.

Additional Examples

Some examples are directed to a system for multi-spectral rendering that comprises: a simulator component; a material library including banded material data comprising, for at least one material, spectral band information for a plurality of spectral band sets; an asset library including, for at least one asset, a mesh and a material pointer associated with the mesh and indicating the at least one material in the material library; a rendering engine; and a material translator component operative to, based at least on the material pointer and a first spectral band selection, indicate a first banded material data set of the plurality of spectral band sets, and wherein the simulator component is operative to control the rendering engine to render the at least one asset according to the mesh and the first banded material data set.

Some examples are directed to a method of multi-spectral rendering that comprises: receiving a selection of at least one asset for a simulation; receiving a spectrum selection for the simulation; receiving a mesh and a material pointer for the at least one asset; identifying a first spectral band selection within the spectrum selection for the simulation; based at least on the material pointer and the first spectral band selection, receiving a first banded material data set from among a plurality of spectral band sets, wherein the plurality of spectral band sets comprises the first banded material data set and a second banded material data set; and rendering the at least one asset according to the mesh and first banded material data set.

Some examples are directed to one or more computer storage devices having computer-executable instructions stored thereon for multi-spectral rendering, which, on execution by a computer, cause the computer to perform operations comprising: receiving a selection of at least one asset for a simulation; receiving a spectrum selection for the simulation; receiving a material pointer for the at least one asset; allocating the spectrum selection among a plurality of spectral band sets, the plurality of spectral band sets including a first spectral band set and a second spectral band set; based at least on the material pointer and the first spectral band selection corresponding to the first spectral band set, receiving the first banded material data set; rendering the at least one asset according to the mesh and the first banded material data set; based at least on the material pointer and the second spectral band selection corresponding to the second spectral band set, receiving the second banded material data set; rendering the at least one asset according to the mesh and the second banded material data set; combining a result of rendering the at least one asset according to the mesh and the first banded material data set with a result of rendering the at least one asset according to the mesh and the second banded material data set into a combined spectrum result; and controlling a display to render the combined spectrum result.

Alternatively or in addition to the other examples described herein, some examples include any combination of the following: the first banded material data set comprises a first set of visible light spectral bands; the first set of visible light spectral bands comprises red, green, and blue colors of visible light; a second banded material data set of the plurality of spectral band sets comprises a second set of visible light spectral bands different than the first set of visible light spectral bands; a second banded material data set of the plurality of spectral band sets comprises a set of spectral bands selected from the set consisting of IR, UV, RF, and MW; the simulator component is further operative to control the rendering engine to render the at least one asset according to the mesh and a second banded material data set of the plurality of spectral band sets; the simulator component is further operative to combine a result of rendering the at least one asset according to the mesh and the first banded material data set with a result of rendering the at least one asset according to the mesh and the second banded material data set into a combined spectrum result; the simulator component is further operative to receive a spectrum selection and allocate the spectrum selection among the plurality of spectral band sets; a scanner arrangement operative to receive a sample of the at least one material; receive a spectral band specification for scanning the sample of the at least one material; scan the material sample according to the spectral band specification to produce material scan data; and generate an entry into the material library, wherein the material scan data forms at least a portion of the spectral band information for the at least one material; allocating the spectrum selection among a plurality of spectral band sets, the plurality of spectral band sets including a first spectral band set and a second spectral band set, wherein the first spectral band selection corresponds to the first spectral band set; based at least on the material pointer and the second spectral band selection corresponding to the second spectral band set, receiving the second banded material data set; rendering the at least one asset according to the mesh and the second banded material data set; combining a result of rendering the at least one asset according to the mesh and the first banded material data set with a result of rendering the at least one asset according to the mesh and the second banded material data set into a combined spectrum result; receiving a sample of at least one material; receiving a spectral band set specification for scanning the sample of the at least one material; scanning the material sample according to the specified spectral band set to produce material scan data; and generating an entry into a material library, wherein the material scan data forms at least a portion of spectral band information for the at least one material; and the banded material data set comprises at least a portion of the spectral band information.

While the aspects of the disclosure have been described in terms of various examples with their associated operations, a person skilled in the art would appreciate that a combination of operations from any number of different examples is also within scope of the aspects of the disclosure.

Example Operating Environment

FIG. 10 is an illustration of architecture 1000 for creating synthetic imagery, according to some of the various examples disclosed herein. For example, architecture 1000 may create synthetic imagery, possibly as part of a synthetics service 1212 (of FIG. 12) using multi-spectral rendering arrangement 100, scanner arrangement 800, and/or the operations of any of flow charts 600, 700, and 900. In architecture 1000, several inputs, including an artist workflow 1002, an asset management 1004, and other workflows (a scripted workflow 1006*a*, a guided workflow 1006*b*, and a custom workflow 1006*c*) interface via a synthetics API 1008 to a synthetics service 1020. Synthetics service 1020 (synthetic simulation service) has multiple components or modules, including a renderer 1010, a sensor modeler 1012, a motion module 1014, a scene generation module 1016, and a scheduler 1018. Renderer 1010 may be similar in function to rendering engine 190 (of FIG. 1), and some examples of renderer 1010 may comprise rendering engine 190. External functionality is illustrated as a physics service 1022 and other external support 1024, which may include off-loaded rendering computations. Synthetics service 1020 includes at least these main core capabilities:

Asset ingestion, which includes artist workflows and, if a user desires to upload their own assets, synthetics service 1020 can ingest the user data and verify compatibility with the simulation system.

Sensors/Devices plugin system so a user can implement custom sensors and device logics.

Synthetic simulation setup and environment manipulation for assembling the input to the simulation. A user can use assets in storage medium 1040 to create and manipulate virtual environments, add devices or sensors in the environment, and define device/sensor movements.

Synthetic simulation enabling a user to run the experiment that has been set up, monitor the progress, and collect the results.

The generated synthetic imagery, scene data and other associated data may then be archived in a storage medium 1040 for use in the described virtual experimentation. Storage medium 1040 may be in a cloud environment or may connect to a cloud storage service (e.g., storage 1242 of FIG. 12). As illustrated, various data sets are stored, including the scene data 1030, device data 1032, motion data 1034, asset data 1036, and results 1038. It should be understood that different functionalities may be internal or external services, and that FIG. 10 is only used for illustrative purposes. Together the various functionalities are able to intake virtual objects (assets), lighting models, orchestrated motion, camera and other sensor positions, to render synthetic (virtual) scene imagery.

Figure 11:
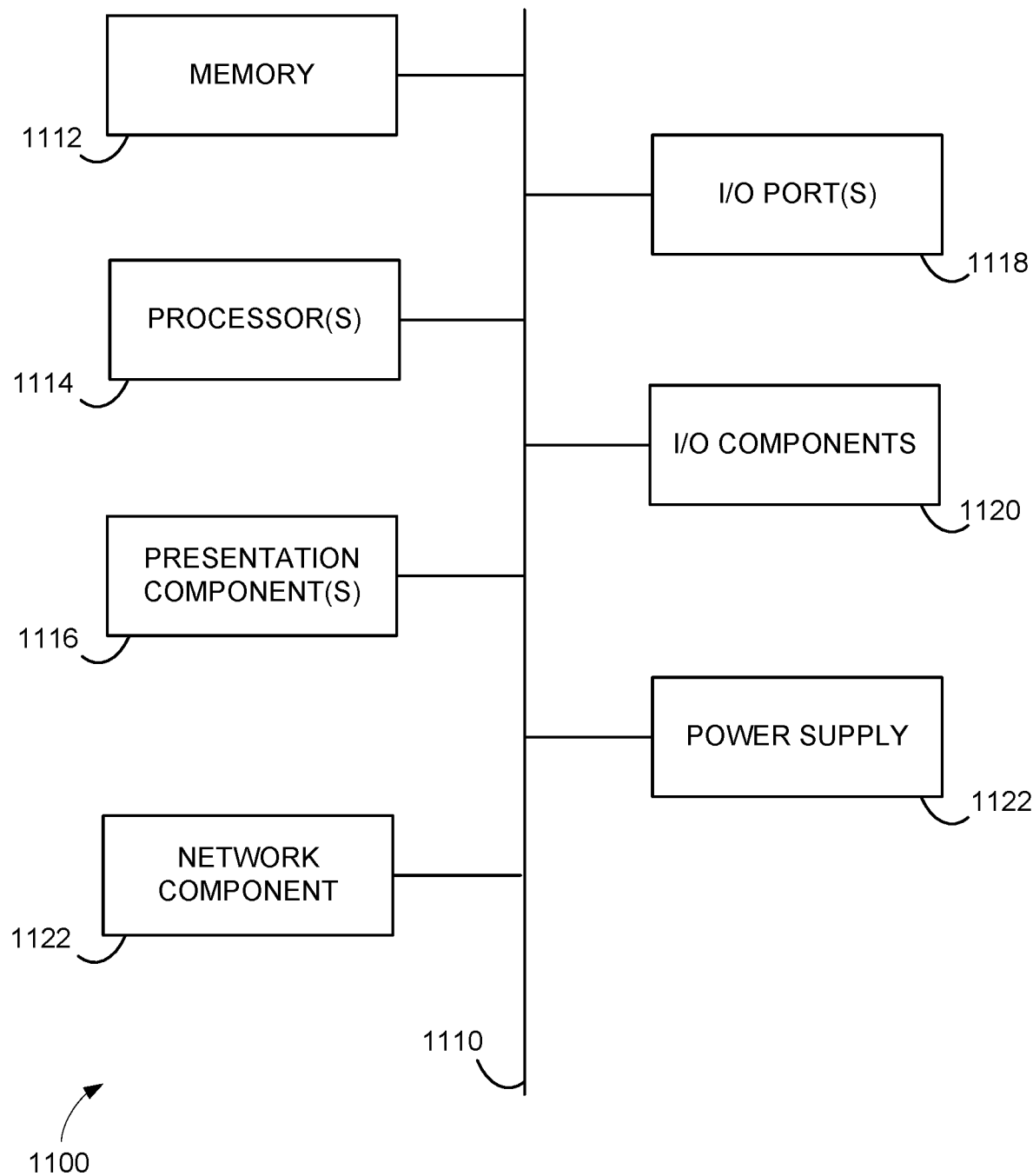
FIG. 11 is an exemplary block diagram illustrating an operating environment for a computing device suitable for implementing various aspects of the disclosure.

FIG. 11 is a block diagram of an example computing device 1100 for implementing aspects disclosed herein, and is designated generally as computing device 1100. Computing device 1100 is one example of a suitable computing environment and is not intended to suggest any limitation as to the scope of use or functionality of the invention. Neither should the computing device 1100 be interpreted as having any dependency or requirement relating to any one or combination of components/modules illustrated. Some examples of synthetics service 1212 and/or the operations of any of flow charts 600, 700, and 900, may be implemented on computing device 1100.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, where tasks are performed by remote-processing devices that are linked through a communications network. For example, a distributed computing environment may host cloud synthetics services. Some embodiments of synthetics services may provide synthetic 3D environments as well as rendering a surface in a synthetic scene.

Computing device 1100 includes a bus 1110 that directly or indirectly couples the following devices: memory 1112, one or more processors 1114, one or more presentation components 1116, input/output (I/O) ports 1118, I/O components 1120, a power supply 1122, and a network component 1124. Computing device 1100 should not be interpreted as having any dependency or requirement related to any single component or combination of components illustrated therein. While computing device 1100 is depicted as a seemingly single device, multiple computing devices 1100 may work together and share the depicted device resources. For example, memory 1112 may be distributed across multiple devices, processor(s) 1114 may provide housed on different devices, and so on.

Bus 1110 represents what may be one or more busses (such as an address bus, data bus, or a combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and the references herein to a "computing device."

Memory 1112 may include any of the computer-readable media discussed herein. Memory 1112 may be used to store and access instructions configured to carry out the various operations disclosed herein. In some examples, memory 1112 includes computer storage media in the form of volatile and/or nonvolatile memory, removable or non-removable memory, data disks in virtual environments, or a combination thereof.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flowcharts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100.

Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways.

Ports 1118 allow computing device 1100 to be logically coupled to other devices including I/O components 1120, some of which may be built in. Example I/O components 1120 include, for example but without limitation, a microphone, keyboard, mouse, joystick, game pad, satellite dish, scanner, printer, wireless device, etc.

In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, the network component 1124 is operable to communicate data over public, private, or hybrid (public and private) using a transfer protocol, between devices wirelessly using short range communication technologies (e.g., near-field communication (NFC), BLUETOOTH® branded communications, or the like), or a combination thereof.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Figure 12:
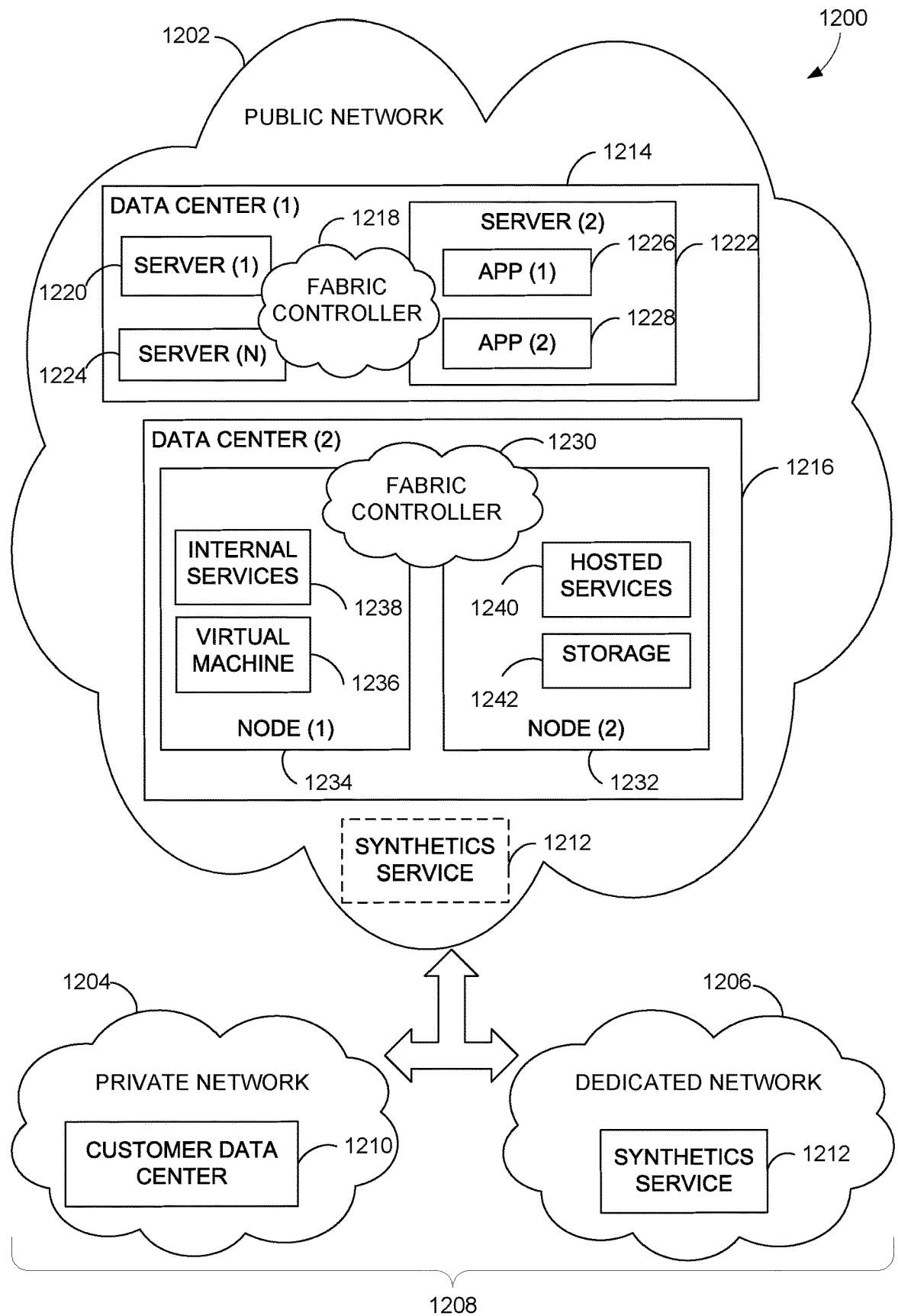
FIG. 12 is a block diagram of an example cloud-computing infrastructure suitable for implementing some of the various examples disclosed herein.

Turning now to FIG. 12, an exemplary block diagram illustrates a cloud-computing environment for providing a synthetics service. Architecture 1200 illustrates an exemplary cloud-computing infrastructure, suitable for use in implementing aspects of this disclosure. Architecture 1200 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 12 includes a public network 1202, a private network 1204, and a dedicated network 1206. Public network 1202 may be a public cloud-based network of computing resources, for example. Private network 1204 may be a private enterprise network or private cloud-based network of computing resources. And dedicated network 1206 may be a third-party network or dedicated cloud-based network of computing resources. In some examples, private network 1204 may host a customer data center 1210, and dedicated network 1206 may each host a cloud synthetics service 1212, which was introduced in the description of FIG. 10.

Hybrid cloud 1208 may include any combination of public network 1202, private network 1204, and dedicated network 1206. For example, dedicated network 1206 may be optional, with hybrid cloud 1208 comprised of public network 1202 and private network 1204. Along these lines, some customers may opt to only host a portion of their customer data center 1210 in the public network 1202 and/or dedicated network 1206, retaining some of the customers' data or hosting of customer services in the private network 1204. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 1208 in which some data storage and processing is performed in the public network 1202 while other data storage and processing is performed in the dedicated network 1206.

Public network 1202 may include data centers configured to host and support operations, including tasks of a distributed application, according to the fabric controller 1218. It will be understood and appreciated that data center 1214 and data center 1216 shown in FIG. 12 are merely examples of suitable implementations for accommodating one or more distributed applications, and are not intended to suggest any limitation as to the scope of use or functionality of examples disclosed herein. Neither should data center 1214 and data center 1216 be interpreted as having any dependency or requirement related to any single resource, combination of resources, combination of servers (e.g., servers 1220 and 1224) combination of nodes (e.g., nodes 1232 and 1234), or a set of application programming interfaces (APIs) to access the resources, servers, and/or nodes.

Data center 1214 illustrates a data center comprising a plurality of servers, such as servers 1220 and 1224. A fabric controller 1218 is responsible for automatically managing the servers 1220 and 1224 and distributing tasks and other resources within the data center 1214. By way of example, the fabric controller 1218 may rely on a service model (e.g., designed by a customer that owns the distributed application) to provide guidance on how, where, and when to configure server 1222 and how, where, and when to place application 1226 and application 1228 thereon. One or more role instances of a distributed application may be placed on one or more of the servers 1220 and 1224 of data center 1214, where the one or more role instances may represent the portions of software, component programs, or instances of roles that participate in the distributed application. In other examples, one or more of the role instances may represent stored data that are accessible to the distributed application.

Data center 1216 illustrates a data center comprising a plurality of nodes, such as node 1232 and node 1234. One or more virtual machines may run on nodes of data center 1216, such as virtual machine 1236 of node 1234 for example. Although FIG. 12 depicts a single virtual node on a single node of data center 1216, any number of virtual nodes may be implemented on any number of nodes of the data center in accordance with illustrative embodiments of the disclosure. Generally, virtual machine 1236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 1236 may include processing capacity, storage locations, and other assets within the data center 1216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 1230 is responsible for automatically managing the virtual machines running on the nodes of data center 1216 and for placing the role instances and other resources (e.g., software components) within the data center 1216. By way of example, the fabric controller 1230 may rely on a service model (e.g., designed by a customer that owns the service application) to provide guidance on how, where, and when to configure the virtual machines, such as virtual machine 1236, and how, where, and when to place the role instances thereon.

As described above, the virtual machines may be dynamically established and configured within one or more nodes of a data center. As illustrated herein, node 1232 and node 1234 may be any form of computing devices, such as, for example, a personal computer, a desktop computer, a laptop computer, a mobile device, a consumer electronic device, a server, the computing device 1100 of FIG. 11, and the like. In one instance, the nodes 1232 and 1234 host and support the operations of the virtual machine(s) 1236, while simultaneously hosting other virtual machines carved out for supporting other tenants of the data center 1216, such as internal services 1238, hosted services 1240, and storage 1242. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 1202. The network cloud serves to interconnect resources, such as the role instances, which may be distributed across various physical hosts, such as nodes 1232 and 1234. In addition, the network cloud facilitates communication over channels connecting the role instances of the service applications running in the data center 1216. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for multi-spectral rendering, the system comprising:
   a simulator component;
   a material library including sets of banded material data comprising, for at least one material;

spectral band information representing reflectivity of the material as caused by a plurality of unique sets of spectral bands, and
a unique identification (ID) for each set of the sets of banded material data, wherein a set of banded material data includes the spectral band information of the material within a unique spectral band;
an asset library including, for at least one asset:
a three dimensional (3D) mesh, and
a material pointer associated with the 3D mesh and that points to the at least one material in the material library;
a rendering engine; and
a material translator component operative to, based at least on the material pointer and a first spectral band selection, obtain a pointer to a unique ID of a first banded material data set of the plurality of spectral band sets, and
wherein the simulator component is operative to control the rendering engine to render the at least one asset according to the 3D mesh and the first banded material data set.

2. The system of claim 1 wherein the first banded material data set comprises a first set of visible light spectral bands.

3. The system of claim 2 wherein the first set of visible light spectral bands comprises red, green, and blue colors of visible light.

4. The system of claim 2 wherein a second banded material data set of the plurality of spectral band sets comprises a second set of visible light spectral bands different than the first set of visible light spectral bands.

5. The system of claim 2 wherein a second banded material data set of the plurality of spectral band sets comprises a set of spectral bands selected from the set consisting of:
infrared (IR), ultraviolet (UV), radio frequency (RF), and microwave (MW).

6. The system of claim 1 wherein the simulator component is further operative to:
control the rendering engine to render the at least one asset according to the 3D mesh and a second banded material data set of the plurality of spectral band sets.

7. The system of claim 6 wherein the simulator component is further operative to:
combine a result of rendering the at least one asset according to the 3D mesh and the first banded material data set with a result of rendering the at least one asset according to the 3D mesh and the second banded material data set into a combined spectrum result.

8. The system of claim 7 wherein the simulator component is further operative to:
receive a spectrum selection; and
allocate the spectrum selection among the plurality of unique sets of spectral bands.

9. The system of claim 1 further comprising:
a scanner arrangement operative to:
receive a sample of the at least one material;
receive a spectral band specification for scanning the sample of the at least one material;
scan the material sample according to the spectral band specification to produce material scan data; and
generate an entry into the material library, wherein the material scan data forms at least a portion of the spectral band information for the at least one material.

10. A method of multi-spectral rendering, the method comprising:
receiving a selection of at least one asset for a simulation;
receiving a spectrum selection for the simulation;
receiving a three dimensional (3D) mesh and a material pointer for the at least one asset, the material pointer indicating a material of a plurality of materials associated with the at least one asset;
identifying a first spectral band selection within the spectrum selection for the simulation, wherein the first spectral band selection is a unique spectral band of a plurality of unique sets of spectral bands within the spectrum selection;
based at least on the material pointer and the first spectral band selection, receiving a first banded material data set from among a plurality of banded material data sets of the indicated material, wherein the plurality of banded material data sets of the indicated material, comprises the first banded material data set of the indicated material, a second banded material data set of the indicated material; and
rendering the at least one asset according to the 3D mesh and first banded material data set of the indicated material.

11. The method of claim 10 wherein the first banded material data set comprises a first set of visible light spectral bands.

12. The method of claim 11 wherein the first set of visible light spectral bands comprises red, green, and blue colors of visible light.

13. The method of claim 10 further comprising:
allocating the spectrum selection among the plurality of unique sets of spectral bands within the spectrum selection, the plurality of unique sets of spectral bands including a first spectral band set and a second spectral band set, wherein the first spectral band selection corresponds to the first spectral band set;
based at least on the material pointer and a second spectral band selection corresponding to the second spectral band set, receiving the second banded material data set; and
rendering the at least one asset according to the 3D mesh and the second banded material data set.

14. The method of claim 13 further comprising:
combining a result of rendering the at least one asset according to the 3D mesh and the first banded material data set with a result of rendering the at least one asset according to the 3D mesh and the second banded material data set into a combined spectrum result.

15. The method of claim 13 wherein the first banded material data set comprises a first set of visible light spectral bands and wherein the second banded material data set comprises a second set of visible light spectral bands different than the first set of visible light spectral bands.

16. The method of claim 13 wherein the second banded material data set comprises a set of spectral bands selected from the set consisting of:
infrared (IR), ultraviolet (UV), radio frequency (RF), and microwave (MW).

17. The method of claim 13 further comprising:
receiving a sample of at least one material;
receiving a spectral band set specification for scanning the sample of the at least one material;
scanning the material sample according to the specified spectral band set to produce a banded material scan data; and generating an entry into a material library, wherein the banded material scan data forms at least a portion of spectral band information for the at least one material.

18. The method of claim 17 wherein the banded material data set comprises at least a portion of the spectral band information.

19. One or more computer storage devices having computer-executable instructions stored thereon for multi-spectral rendering, which, on execution by a computer, cause the computer to perform operations comprising:

receiving a selection of at least one asset for a simulation;

receiving a spectrum selection for the simulation;

receiving a material pointer for the at least one asset, the material pointer indicating a material of a plurality of materials associated with the at least one asset;

allocating the spectrum selection among a plurality of unique sets of spectral bands, the plurality of unique sets of spectral bands including a first spectral band set and a second spectral band set;

based at least on the material pointer and a first spectral band selection corresponding to the first spectral band set, receiving a first banded material data set;

rendering the at least one asset according to the first banded material data set and a 3D mesh of the at least one asset;

based at least on the material pointer and a second spectral band selection corresponding to the second spectral band set, receiving a second banded material data set;

rendering the at least one asset according to the 3D mesh and the second banded material data set;

combining a result of rendering the at least one asset according to the 3D mesh and the first banded material data set with a result of rendering the at least one asset according to the 3D mesh and the second banded material data set into a combined spectrum result; and controlling a display to render the combined spectrum result.

20. The one or more computer storage devices of claim 19 wherein a first set of visible light spectral bands comprises red, green, and blue colors of visible light and wherein the second banded material data set comprises a set of spectral bands selected from the set consisting of:

infrared (IR), ultraviolet (UV), radio frequency (RF), and a second set of visible light spectral bands different than the first set of visible light spectral bands.

* * * * *